United States Patent [19]

Oda et al.

[11] 4,358,917
[45] Nov. 16, 1982

[54] SELF-ADJUSTABLE WINDOW MOLDING FOR RETAINING GLASS

[75] Inventors: Roy Oda, Westland; Richard W. Nicholas, Livonia, both of Mich.

[73] Assignee: Chrysler Corporation, Highland Park, Mich.

[21] Appl. No.: 262,083

[22] Filed: May 11, 1981

[51] Int. Cl.³ ............... E04C 2/38; E04C 5/07; E04B 1/62; E04C 1/34
[52] U.S. Cl. ............... 52/717; 52/400; 52/468; 52/716
[58] Field of Search .............. 52/716, 717, 211, 400, 52/208, 397, 821, 401, 402, 403, 417, 468; 49/497, 496, 495, 494; 296/93, 84 A, 84 B, 84 R

[56] References Cited

U.S. PATENT DOCUMENTS 2,606,635  8/1952  Clingman .................... 52/716
3,375,626  4/1968  Grotefeld et al. .............. 52/208

FOREIGN PATENT DOCUMENTS 1093977  12/1960  Fed. Rep. of Germany ........ 52/397
715361  6/1954  United Kingdom ............... 52/717

*Primary Examiner*—Alfred C. Perham
*Assistant Examiner*—Eugene R. Washington
*Attorney, Agent, or Firm*—Newtson & Dundas

[57] ABSTRACT

An improved extruded resilient flush-look window molding adapted for pre-attachment to a glass plate for concealing the gap between a body panel window opening and the edge of the glass plate. The molding has a stem portion with first and second self-biased retaining legs on one side thereof, adapted to engage the glass edge and a diverging third leg extending from the stem portion opposite side supporting an integral arcuate sectioned trim strip in cantilever fashion on the diverging leg upper end. The trim strip projects inwardly to overlie the gap and the molding stem portion. The divergent leg is self-biased for cammed inward flexing during insertion of the glass plate. Thus, the trim strip self-adjusts inwardly so as to maintain its engagement with the plate outer surface while accommodating production tolerance gaps.

1 Claim, 3 Drawing Figures

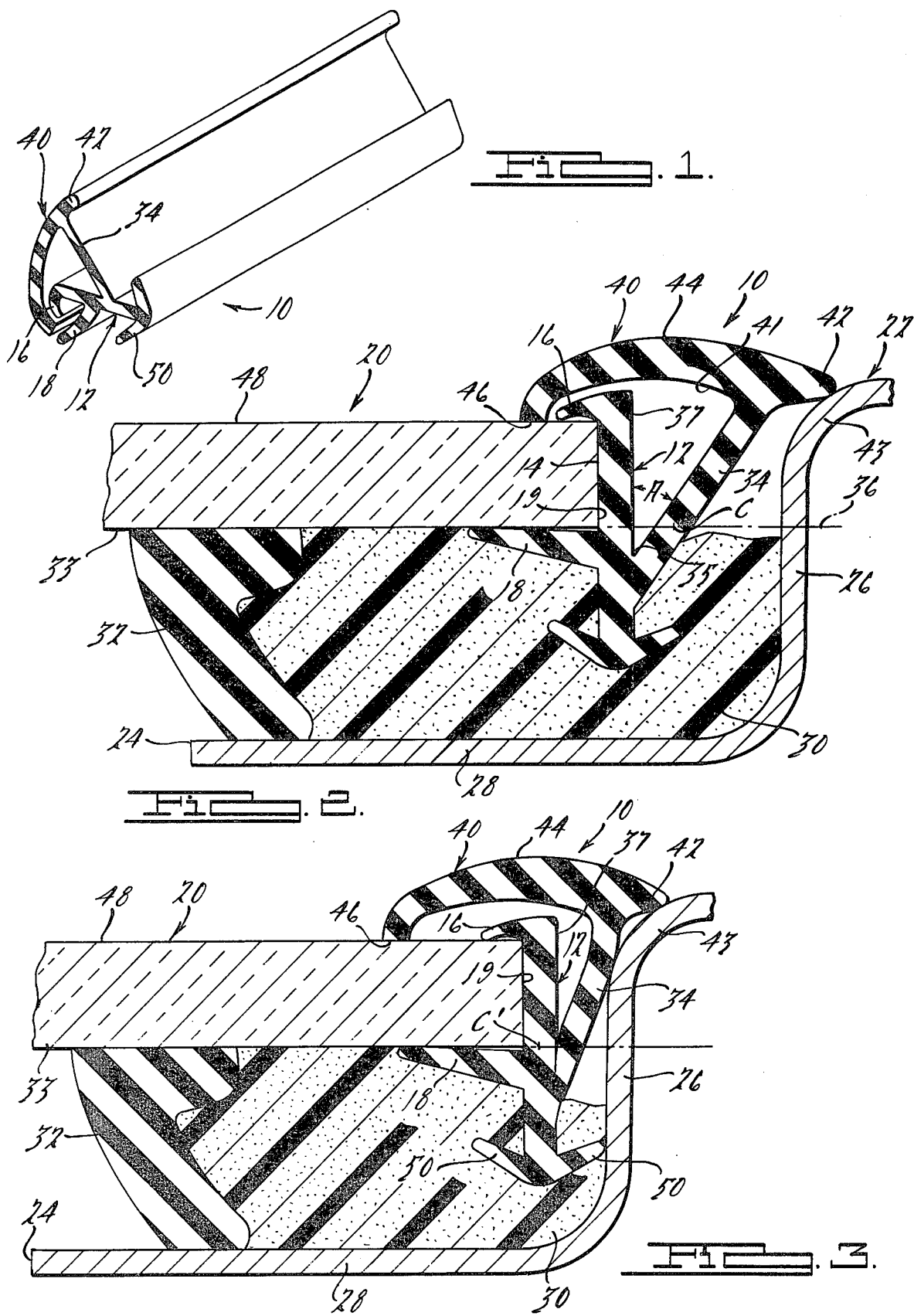

SELF-ADJUSTABLE WINDOW MOLDING FOR RETAINING GLASS

BACKGROUND OF THE INVENTION

This invention relates to a window molding for a vehicle body and more particularly to a pre-affixed glass plate molding which is adjustable for concealing various production tolerance differentials between the plate and the vehicle body window opening.

Examples of existing practice in mounting window glass plates in vehicle flanged window openings appear in U.S. Pat. Nos. 3,851,432 issued Dec. 3, 1974 to Griffin and U.S. Pat. No. 4,165,119 issued Aug. 21, 1979 to Hedeen et al. In these typical arrangements the window glass is bonded in a flanged vehicle body opening by a bead of cureable adhesive. The gap between the window glass and the vehicle body is concealed by a flexible molding which bridges the space or gap between the body panel window opening and the glass plate. In the above mentioned Griffin and Hedeen patents the molding is adhesively secured in the gap following installation of the glass.

The U.S. Pat. No. 3,759,004 issued Sept. 12, 1973 to Kent discloses a trim strip made of flexible material with a channel portion receiving the edge of the glass. A decorative strip portion extends from the channel portion and overlies the channel and the gap between the edge of the glass plate and the body flange. The U.S. Pat. No. 3,714,751 issued Feb. 6, 1973 to Lockey discloses a two-piece molding with a pre-affixed retaining strip.

SUMMARY OF THE INVENTION

Briefly, the improved molding of this invention comprises a stem portion having formed adjacent its upper end a pair of spaced mutually converging self-biasing legs which are pre-affixed to the edge of the glass. A third leg extends from the other side of the stem portion and is self-biased upwardly and outwardly at an acute angle supporting at its upper end in a cantilever manner a decorative arcuate-sectioned trim member adjacent the strip's outer edge. The outer edge of the trim strip has a lip portion adapted to contact the flange wall of the window opening enabling the trim strip to overlie the stem portion and gap with its free edge engaging the outside surface of the glass to accommodate maximum dimensional variations between the glass and the wall flange. In dimensional situations where the gap approaches a minimal tolerance build-up the trim strip third leg is adapted to engage the wall flange upon insertion of the glass plate. This causes the trim strip free edge to be flexed inwardly about an off-center location inboard from the molding stem portion while being maintained in tight frictional abutment with the glass outer surface to avoid gaps therebetween. The stem lower end has lateral protrusions which extend into a curable adhesive and maintain the molding in the space upon the curing of the adhesive.

It is therefore an object of the present invention to provide an improved one-piece plastic molding which is pre-attached to the edge of a vehicle window glass plate and includes an arcuate-sectioned cantilever type trim strip portion which is cammed inwardly about a flexible divergent support leg to bridge the variable dimensioned space between the glass plate edge and the flanged window opening.

It is another feature of the present invention to provide a molding for an adhesively bonded vehicle window as set forth above which operates to locate the glass plate in a window rebate providing a "flush" effect with the body panel.

These and other objects and features will become apparent to those skilled in the art upon reading the following detailed description with reference to the accompanying drawings in which:

BRIEF DESCRIPTION OF THE DRAWINGS

FIG. 1 is a perspective view of a molding strip made in accordance with the invention;

FIG. 2 is a cross-section of a part of an automobile body windshield opening, illustrating a construction incorporating the invention; and FIG. 3 is a view similar to FIG. 2 but illustrating the application of the invention to a window opening with a reduced spacing.

DETAILED DESCRIPTION OF THE INVENTION

Referring to the drawings, FIG. 1 is a perspective view of a molding generally indicated at 10 having an elongated stem portion 12. The molding is formed as an integral extruded member preferably of a flexible plastic material, such as a polyvinyl chloride. One inner side 14 of the stem portion has first upper 16 and second lower 18 resilient legs integral therewith extending continuously along the length of the stem. The legs 16 and 18 are self-biased and angled towards each other in their "free state". FIG. 1 shows the legs 16 and 18 normally inwardly directed in their mutually converging fashion and adapted to flex into parallel relation upon receiving the edge 19 of a glass plate therebetween, shown by plate 20 in the molding "installed" position of FIG. 2.

As best seen in FIG. 2 the lower leg 18 of the stem portion is of a predetermined lateral dimension greater than the upper leg 16. In the disclosed embodiment this later differential dimension is about two to three times the upper leg 16. The legs 16 and 18 together with the upper portion of the stem 12 form a channel having a base wall defined by a portion of the stem inner side 14.

FIG. 2 shows outer body panel 22 forming a window opening 24 defined by an L-shaped rebate having a wall or reveal flange 26 and an inwardly directed fence flange 28 extending substantially at right angles to the wall flange. The fence flange 28 supports the window glass plate 20 in opening 24 by a bead 30 of curable adhesive sealant or agent, such as made from polyurethane resin base, applied continuously around the fence flange 28 opening 24. A resilient dam 32, formed of suitable elastomeric material, is affixed to the inner side 33 of the window plate 20. The dam 32 acts as a stopper for the bead of curable adhesive 30 while also providing a resilient support for the glass plate.

The stem portion 12 has integrally formed therewith a third or trim strip divergent support leg 34 extending continuously along the length of the molding stem on its outer or other side 37. The support leg 34 is self-biased in its "free" position normally extending upwardly and outwardly at a predetermined acute angle "A" from the plane of the stem portion 12. The divergent leg is located on the stem lower end portion subjacent the medial transverse plane defined by center line 36, substantially coplanar with the inner side 33 of the installed plate 20. In the disclosed form the diverging leg is inclined at an acute angle "A" of about 35° from the plane of the stem portion 12.

Upon the support leg 34 being flexed inwardly to a position substantially contiguous with the stem outer side 37 the support leg 34 and stem have a combined lateral thickness dimension which determines the minimal gap dimensional variation between the window panel edge 19 and the window opening wall flange 26.

The trim strip portion 40 of the molding is formed integral with the upper end of the support leg 34 to provide a cantilever-type resilient molding. The trim strip portion 40 has a generally arcuate cross-section opening to the stem providing a substantially convexly curved appearance from the outside. The support leg 34 is hingedly or pivotally integrally connected to the stem portion at juncture or valley 35 located below the plane of the plate inner surface 33. The support leg 34 is also hingedly integrally connected at its upper extremity adjacent the proximal outer end of strip 40 at its under or concavo curved surface 41. It will be seen that the trim strip portion 40 is provided with a short outwardly and arcuately extending sealing finger or lip portion 42. The lip portion is positioned to yieldingly engage and overlie the radiused corner portion 43 of the body panel in an overlying "flush-look" manner.

As seen in FIG. 2 the arcuate trim portion 40 has its outer surface 44 curvature substantially defined by a radius with its center "C" normally located adjacent the intersection of the support leg 34 with the stem transverse medial plane of dashed-line 36. Thus, upon positioning the window plate 20 and its preattached molding 10 within the flanged window opening the contact of the lip portion 42 with the body panel radius 43 results in distal free end 46 of the trim strip yieldably engaging the plate 20 upper surface 48. The gap between the body panel and glass plate together with the molding stem portion 12 is thus substantially concealed.

With reference to FIG. 3 the gap between the glass plate edge 19 and the wall flange 26 is of the order of one-half the maximum gap situation shown in FIG. 2. It will be noted that upon the placement of the glass plate 20 and molding 10 assembly in the window opening the radiused portion 43 will engage the support leg 34. This engagement of the diverging support leg 34 with the radius 43 of the body results in the leg 34 being swung toward the stem 12. This swinging movement causes the trim strip to be moved inwardly along the glass plate surface 48. The arcuate shape of the trim strip results in the strip distal end 46 being maintained in engagement with the glass plate outer surface 48.

It will be appreciated that the third leg 34 has a predetermined transverse or lateral dimension whereby it is substantially equal to but greater than the transverse dimension of said stem measured from the valley 35 to its upper end. This allows the trim strip concave surface 41 to move relative to the stem upper first leg 16 without interference.

As shown in FIG. 3 the arcuate trim strip 40 has its center of curvature of surface 44 is translated inwardly to a curvature axis "C" located adjacent the intersection of the support leg 34 with the stem transverse medial plane indicated by dashed-line 36. Thus, the molding commonly known to the trade as a "flush" effect or look.

The support leg 34 also acts as a flexible vibration or shock absorbing stop between the glass plate and the reveal flange wall 26. The construction also insures that arrow like protrusions 50 on the lower end of the stem 12 will not be excessively distorted or flexed to interfere with their being thrust into the bead 30 of curable adhesive during installation of the window glass plate 20.

What is claimed is:

1. A flexible one-piece molding preattached to a glass plate edge for closing a vehicle body window receiving opening defined by an L-section rebate forming a reveal flange and a fence flange, the glass plate and molding upon location in the opening being retained by a bead of curable adhesive, the plate when located in the opening having a variable gap between the reveal flange and the edge of the glass plate, said molding comprising:

an elongated stem having first and second inwardly directed mutual converging resilient upper and lower legs respectively, extending from one side of said stem continuously along its length, said first leg having a predetermined lateral dimension of the order of two to three times less than said lower leg, said legs being self-biased such that they are adapted to receive the edge of the plate for retaining the molding in substantially fixed relation with the plate wherein said first upper leg is adapted to engage the plate outer surface and said second lower leg is adapted to engage the plate inner surface;

a third support leg extending continuously along the length of said molding stem other side, said third leg located on said stem lower end portion subjacent the medial transverse plane defined by a center-line substantially coplanar with the inner surface of the installed glass plate, said third leg being self-biased so as to normally diverge upwardly and outwardly at a predetermined acute angle from the stem lower portion defining a valley therewith;

said third leg having a predetermined transverse dimension whereby its upper end is located at a distance from said valley slightly greater than the distance from said valley to said stem upper end;

a coextensive arcuate-sectioned trim strip integral with said third leg upper end at a juncture adjacent the trim strip outer longitudinal edge, said trim strip including a lip portion normally extending from said third leg upper end outwardly in the direction of curvature of said arcuate-sectional trim strip, wherein said trim strip extends inwardly from said diverging third leg such that in its normal unflexed position said third leg supports said trim strip in a cantilever manner whereby the projected area of said trim strip overlies said stem portion and the gap, and said trim strip free edge adapted to engage the outer surface of the glass plate;

said stem lower end portion formed with lateral protrusions adapted to be received in the bead of curable adhesive upon the glass plate being inserted in the window opening; and said molding of a size whereby with the existence of a predetermined maximum gap said trim strip being of a size to engage the body panel to conceal the gap, and wherein with a reduced tolerance gap said third leg together with its lip portion are adapted to engage the reveal flange causing said trim strip free edge to be moved inwardly in a self-adjusting manner while flexing said trim strip free edge into continued engagement with the glass plate outer surface, whereby said molding trim strip presents a uniform flush-like gap free appearance throughout a production tolerance gap range.

* * * * *